W. R. K. GANDELL.
JOINT FOR WOODWORK.
APPLICATION FILED DEC. 27, 1915.
1,250,841.
Patented Dec. 18, 1917.
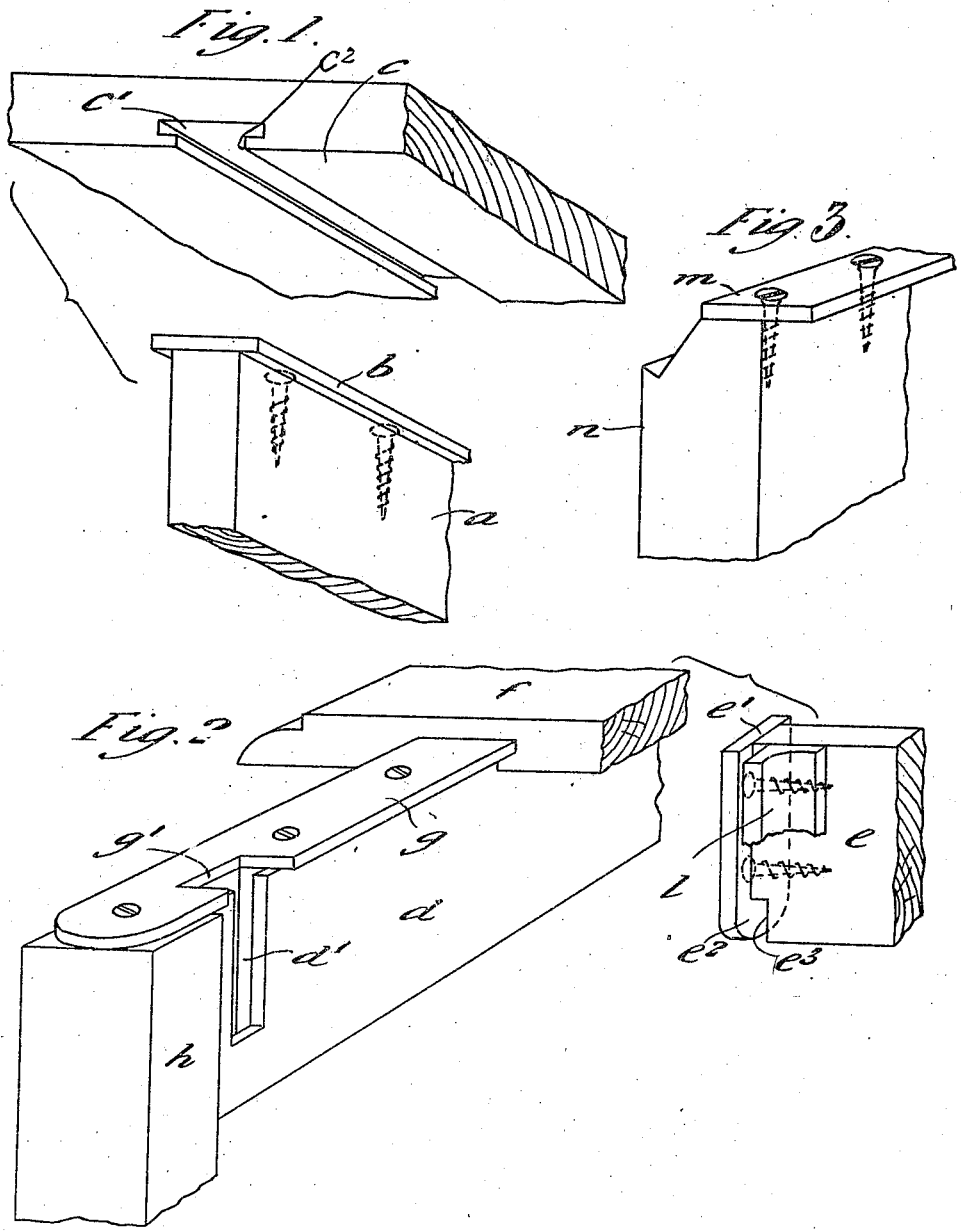

UNITED STATES PATENT OFFICE.

WILLIAM RALEIGH KERR GANDELL, OF LONDON, ENGLAND.

JOINT FOR WOODWORK.

1,250,841.   Specification of Letters Patent.   Patented Dec. 18, 1917.

Application filed December 27, 1915. Serial No. 68,844.

*To all whom it may concern:*

Be it known that I, WILLIAM RALEIGH KERR GANDELL, a subject of the King of Great Britain, residing in London, England, have invented a certain new and useful Joint for Woodwork, of which the following is a specification.

A satisfactory method of joining together parts of a piece of furniture or the like so that they can be readily separated, must fulfil two conditions, namely, the wood of one part must penetrate and abut against the wood of the other part and the means of joining must be concealed from view as far as possible.

This invention relates to a method of joining together abutting portions of woodwork or its equivalent, which fulfils the above desiderata and is at the same time both simple and cheap.

By the invention there is cut a T or L shaped groove in the face of one of the portions to be joined, the cross branch of the T or L being made wider than the other branch which is given a width that is uniform and equal to the thickness of the other or second portion that is to penetrate into the first portion when the two portions are joined. To that face of the said second portion which is to be parallel to the bottom of the groove when the joint is complete, is fixed a plate of metal or other suitable material and of such dimensions that it extends beyond the surface to which it is applied and projects over one or more of the other faces of this portion, thus making with the wood a T or L of dimensions such that it may be slid into the groove from the end thereof and will closely fit and fill the groove.

Examples of the invention are shown in the accompanying drawings in which Figures 1 and 2 are perspective views of parts of pieces of furniture prepared and ready for joining together according to the invention; Fig. 1 may be considered to represent the top and a vertical division of a bookcase; and in Fig. 2 are shown parts of a table. Fig. 3 is an example wherein only one long edge of the bar secured to one of the members to be joined together projects beyond the surface to which it is applied.

Referring to Fig. 1, there is screwed or nailed along the top edge of the divisional part $a$ a plate $b$ of iron or any other suitable material of greater width than the thickness of the piece or part $a$ so that it projects beyond both side faces of that part, while in the under face of the top $c$ of the bookcase is cut a T shaped slot comprising the two parts $c'$ and $c^2$ running through at least to one edge of the top $c$. The dimensions of the slot $c'$ $c^2$ are such that the end of the division $a$ can be slid into the part $c^2$ of the slot with the aforesaid plate $b$ engaging in the cross-head or branch $c'$ of the T shaped slot. The width of the part $c^2$ is uniform and equal to the thickness of the divisional part $a$ while the width of the part $c'$ is greater than that of part $a$.

As the end of the division $a$ is, in addition, housed to a greater or smaller depth in the top when the two parts are put together, a very firm joint is obtained.

In some instances it is preferable or desirable that the groove or slot for the reception of the retaining bar should extend only part of the way between the side edges of the part on which it is cut. In Fig. 2 the slot $d'$ on the rail or part $d$ of the table extends only to one edge of the rail $d$, the lower edge of the rail $e$ being notched at $e^3$. The end $e^2$ of the plate $e'$ may overhang to a greater or smaller extent the notched part $e^3$. Fig. 2 also shows how the table top $f$ and the rail $d$, fixed to the table leg $h$, may be joined together by means of the plate $g$, which is notched at $g'$ for the reception and passage of the end of the rail $e$.

In Fig. 3, the plate $m$ is attached to the part $n$ in a manner to project beyond the end face of the part $n$ on one side only, and in this case the slot in the other part to which the part $n$ is to be joined would be of L shape. This mode of forming a joint may be advantageously adopted in cases where the slot for the bar would be otherwise very near the side face or end of the part in which it is cut.

The invention is particularly applicable to all kinds of furniture and other structures which are to be readily put together and taken apart as occasion may require.

Incidentally, it may be observed that the employment of a joint plate attached to one of the parts to be detachably joined together, as explained above, tends to prevent casting or warping of the joined members and allows of relative movement between them, should any shrinking or expansion occur.

The plate is preferably formed of metal, but may be of any other suitable material.

If desired, the angles between two members joined according to the method of this invention may be filled in by means of moldings, fixed to one or both members. A small portion of a molding so applied, is shown at *l* in Fig. 2, being fixed to the rail *e*, but its use constitutes no part of the invention.

The grooves above referred to may be cut out in any suitable manner and by any appropriate means, for instance, a rectangular groove can first be formed and then the bottom of the groove can be increased in width, as for instance, by means of a circular saw, thereby providing the slot into which the retaining bar or plate can be slid.

Having thus described my invention and the best means I know of carrying the same into practical effect, what I claim is.

A joint for the mutual connection of two members of wood work consisting of a groove formed in the face of the first member and extending from an edge or end of said member, said groove having an outer part at right angles to said face and having its width equal to the thickness of the second member, the latter being of uniform thickness, said groove also having an inner part overhanging said outer part and extending at an angle thereto, said inner part being of substantially greater width than said outer part, the second member having an end which penetrates and fits closely in the outer part of said groove and a separate plate of metal attached to the end face of said penetrating end and conforming in dimensions to the inner part of said groove, said plate projecting laterally from said second member and being attached thereto in such a position that it will closely fit the inner part of said groove when the penetrating end of said second member is fitted in the outer part of said groove.

In testimony whereof I have signed my name to this specification in the presence of two subscribing witnesses.

WILLIAM RALEIGH KERR GANDELL.

Witnesses:
 CLAUDE TAYLOR,
 HERBERT KERSHAW.